(12) United States Patent
Sharma et al.

(10) Patent No.: US 10,255,138 B2
(45) Date of Patent: Apr. 9, 2019

(54) DISASTER RECOVERY TOOL

(71) Applicant: BANK OF AMERICA CORPORATION, Charlotte, NC (US)

(72) Inventors: Anant Bondalapati Sharma, Hyderabad (IN); Badelal Rameshwar Prasad Yadav, Mumbai (IN); Rakesh Madanlal Shah, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 217 days.

(21) Appl. No.: 15/238,859

(22) Filed: Aug. 17, 2016

(65) Prior Publication Data

US 2018/0052743 A1 Feb. 22, 2018

(51) Int. Cl.
*G06F 17/30* (2006.01)
*G06F 11/14* (2006.01)

(52) U.S. Cl.
CPC ...... *G06F 11/1461* (2013.01); *G06F 11/1451* (2013.01); *G06F 11/1469* (2013.01); *G06F 2201/80* (2013.01); *G06F 2201/86* (2013.01)

(58) Field of Classification Search
CPC .................................................... G06F 9/542
USPC ...................... 707/760, 754, 674; 714/20, 15
See application file for complete search history.

(56) References Cited

U.S. PATENT DOCUMENTS

| | | | |
|---|---|---|---|
| 6,134,673 A * | 10/2000 | Chrabaszcz | G06F 11/1658 714/10 |
| 6,363,497 B1 * | 3/2002 | Chrabaszcz | G06F 11/1658 714/13 |
| 7,676,692 B2 | 3/2010 | Costlow | |
| 7,770,058 B2 | 8/2010 | Phan | |
| 7,925,633 B2 | 4/2011 | Suzuki | |
| 8,583,769 B1 * | 11/2013 | Peters | G06F 9/541 709/221 |
| 8,694,822 B2 | 4/2014 | Radhakrishnan | |
| 9,110,851 B2 | 8/2015 | Little | |
| 2007/0198609 A1 * | 8/2007 | Black | G06Q 10/087 |
| 2007/0283438 A1 * | 12/2007 | Fries | G06F 21/562 726/24 |
| 2008/0184068 A1 * | 7/2008 | Mogi | G06F 11/1435 714/15 |
| 2009/0132683 A1 * | 5/2009 | Furuyama | G06F 8/63 709/220 |

* cited by examiner

*Primary Examiner* — Baoquoc N To
(74) *Attorney, Agent, or Firm* — Baker Botts L.L.P.

(57) ABSTRACT

A disaster recovery tool includes a server monitoring engine, a configuration engine, a security engine, and a runtime engine. The server monitoring engine detects a production server and determines that a disaster recovery server should be created for the production server. The configuration engine compares database configuration files for the production server and the disaster recovery server and copies the database configuration file for the production server to the disaster recovery server. The security engine compares user logins and file sharing credentials of the production server and the disaster recovery server and copies the user login and file sharing credential of the production server to the disaster recovery server. The runtime engine compares database jobs and schedules of the production server and the disaster recovery server and copies the database job and schedule of the production server to the disaster recovery server.

21 Claims, 3 Drawing Sheets

DISASTER RECOVERY TOOL

TECHNICAL FIELD

This disclosure relates generally to disaster recovery.

BACKGROUND

Servers and databases store and use information used by applications. In some instances, the servers and databases encounter events (characterized as disastrous events) that result in the information on the servers and databases being destroyed in some manner. For example, the servers and databases may encounter a crash, an intrusion, and/or an external force (such as a natural disaster and/or terrorist attack) that causes the information to be destroyed and/or to become inaccessible.

SUMMARY OF THE DISCLOSURE

According to an embodiment, a disaster recovery tool includes a server monitoring engine, a configuration engine, a security engine, and a runtime engine. The server monitoring engine detects a production server and determines that a disaster recovery server should be created for the production server. The configuration engine compares a database configuration file for the production server with a database configuration file for the disaster recovery server and copies the database configuration file for the production server to the disaster recovery server if the database configuration file for the production server does not match the database configuration file for the disaster recovery server. The security engine compares a user login of the production server with a user login of the disaster recovery server and copies the user login of the production server to the disaster recovery server if the user login of the production server does not match the user login of the disaster recovery server. The security engine further compares a file sharing credential of the production server with a file sharing credential of the disaster recovery server and copies the file sharing credential of the production database to the disaster recovery server if the file sharing credential of the production server does not match the file sharing credential of the disaster recovery server. The runtime engine compares a database job of the production server with a database job of the disaster recovery server and copies the database job of the production server to the disaster recovery server if the database job of the production server does not match the database job of the disaster recovery server. The runtime engine further compares a schedule of the production server with a schedule of the disaster recovery server and copies the schedule of the production server to the disaster recovery server if the schedule of the production server does not match the schedule of the disaster recovery server.

According to another embodiment, a method includes detecting a production server and determining that a disaster recovery server should be created for the production server. The method also includes comparing a database configuration file for the production server with a database configuration file for the disaster recovery server and copying the database configuration file for the production server to the disaster recovery server if the database configuration file for the production server does not match the database configuration file for the disaster recovery server. The method further includes comparing a user login of the production server with a user login of the disaster recovery server and copying the user login of the production server to the disaster recovery server if the user login of the production server does not match the user login of the disaster recovery server. The method also includes comparing a file sharing credential of the production server with a file sharing credential of the disaster recovery server and copying the file sharing credential of the production database to the disaster recovery server if the file sharing credential of the production server does not match the file sharing credential of the disaster recovery server. The method further includes comparing a database job of the production server with a database job of the disaster recovery server and copying the database job of the production server to the disaster recovery server if the database job of the production server does not match the database job of the disaster recovery server. The method also includes comparing a schedule of the production server with a schedule of the disaster recovery server and copying the schedule of the production server to the disaster recovery server if the schedule of the production server does not match the schedule of the disaster recovery server.

According to yet another embodiment, a system includes a production server and a disaster recovery tool. The disaster recovery tool determines that a disaster recovery server should be created for the production server, compares a database configuration file for the production server with a database configuration file for the disaster recovery server, and copies the database configuration file for the production server to the disaster recovery server if the database configuration file for the production server does not match the database configuration file for the disaster recovery server. The disaster recovery tool also compares a user login of the production server with a user login of the disaster recovery server and copies the user login of the production server to the disaster recovery server if the user login of the production server does not match the user login of the disaster recovery server. The disaster recovery tool also compares a file sharing credential of the production server with a file sharing credential of the disaster recovery server and copies the file sharing credential of the production database to the disaster recovery server if the file sharing credential of the production server does not match the file sharing credential of the disaster recovery server. The disaster recovery tool further compares a database job of the production server with a database job of the disaster recovery server and copies the database job of the production server to the disaster recovery server if the database job of the production server does not match the database job of the disaster recovery server. The disaster recovery tool further compares a schedule of the production server with a schedule of the disaster recovery server and copies the schedule of the production server to the disaster recovery server if the schedule of the production server does not match the schedule of the disaster recovery server.

Certain embodiments provide one or more technical advantages. For example, an embodiment improves the operation of a production server after a disastrous event by preserving database configurations, user logins, jobs, schedules, and credentials. As another example, an embodiment improves the operation of a production server by dynamically increasing the storage size of the production server. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
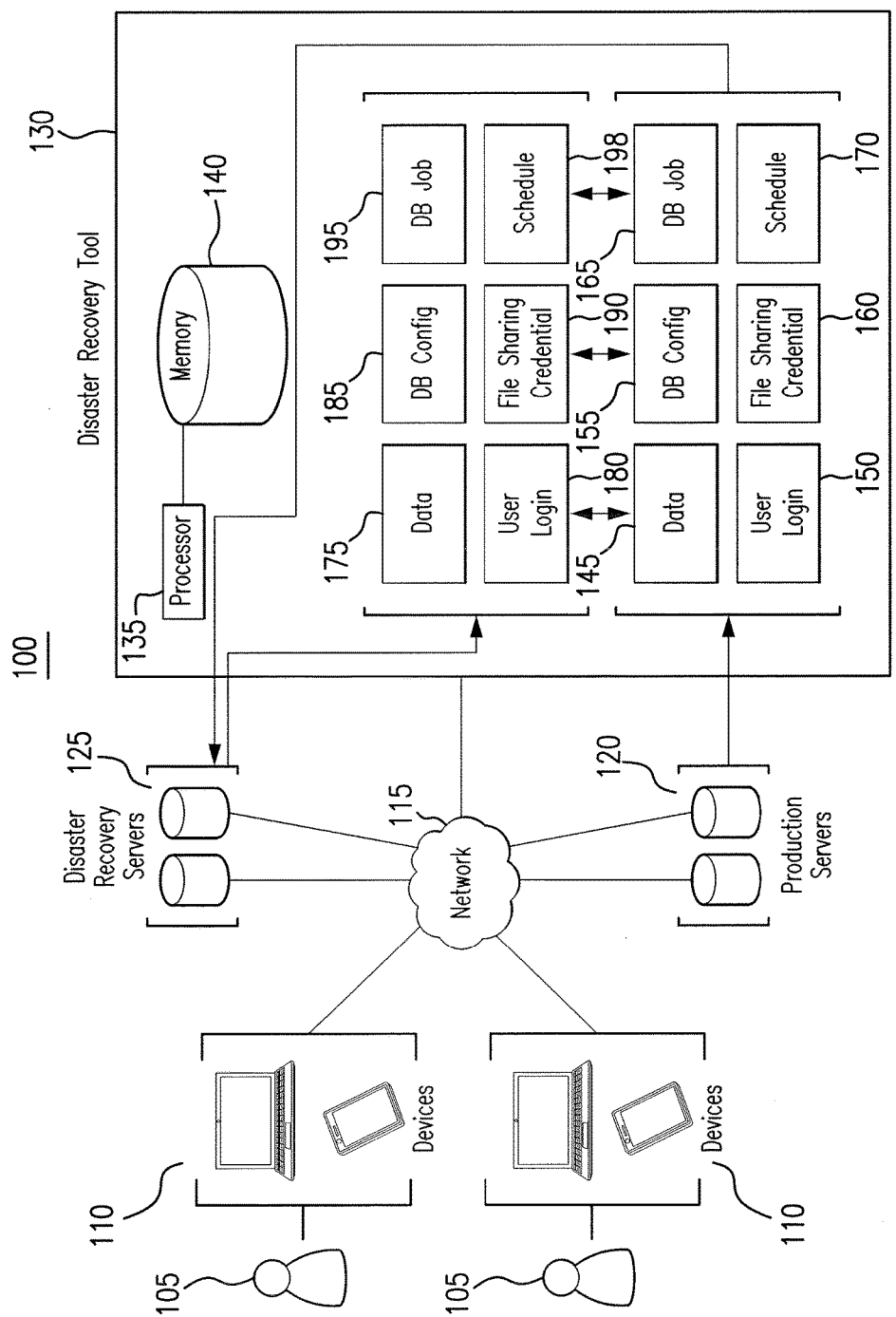
FIG. 1 illustrates a system for disaster recovery.
Figure 2:
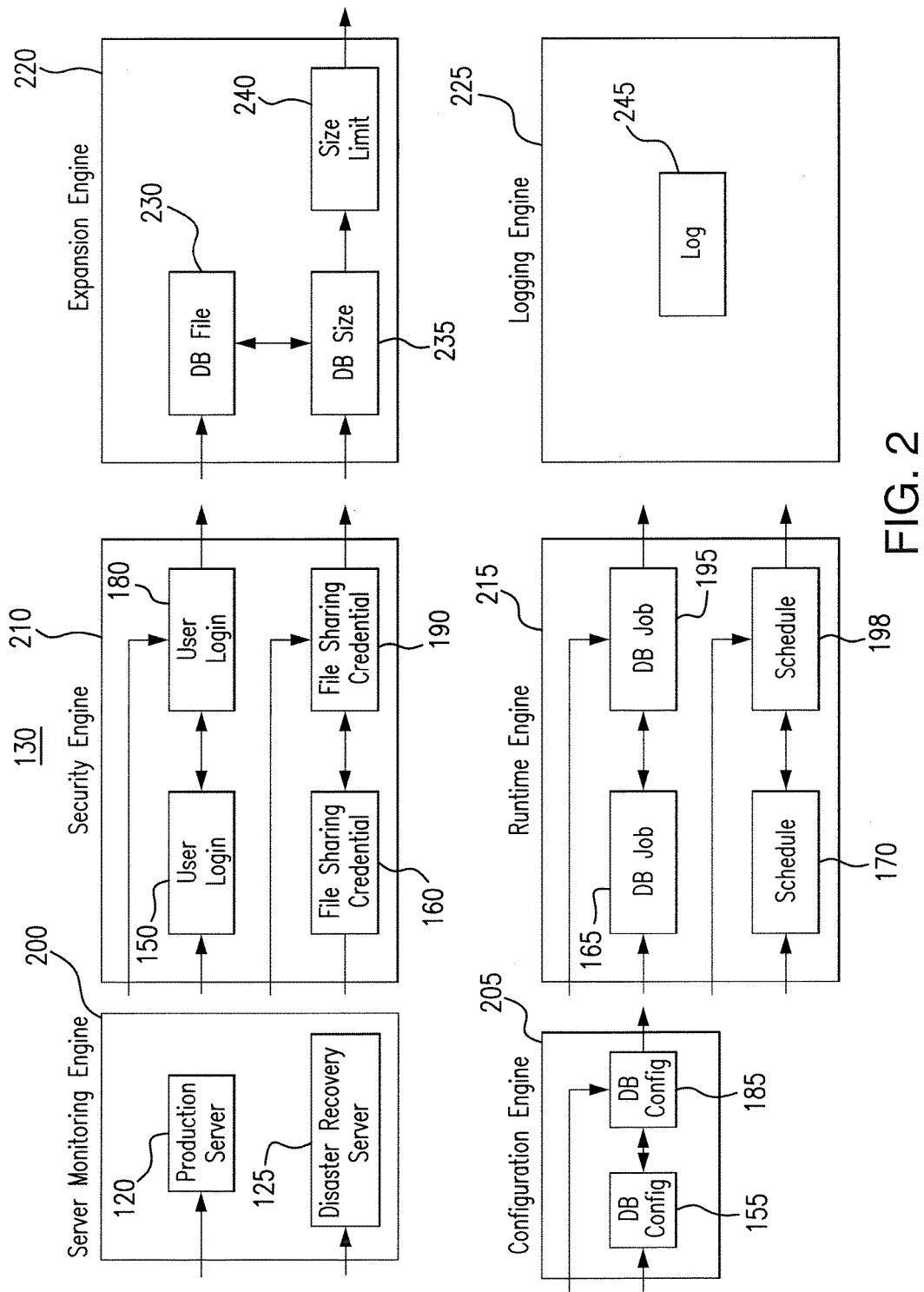
FIG. 2 illustrates the disaster recovery tool of the system of FIG. 1.
Figure 3:
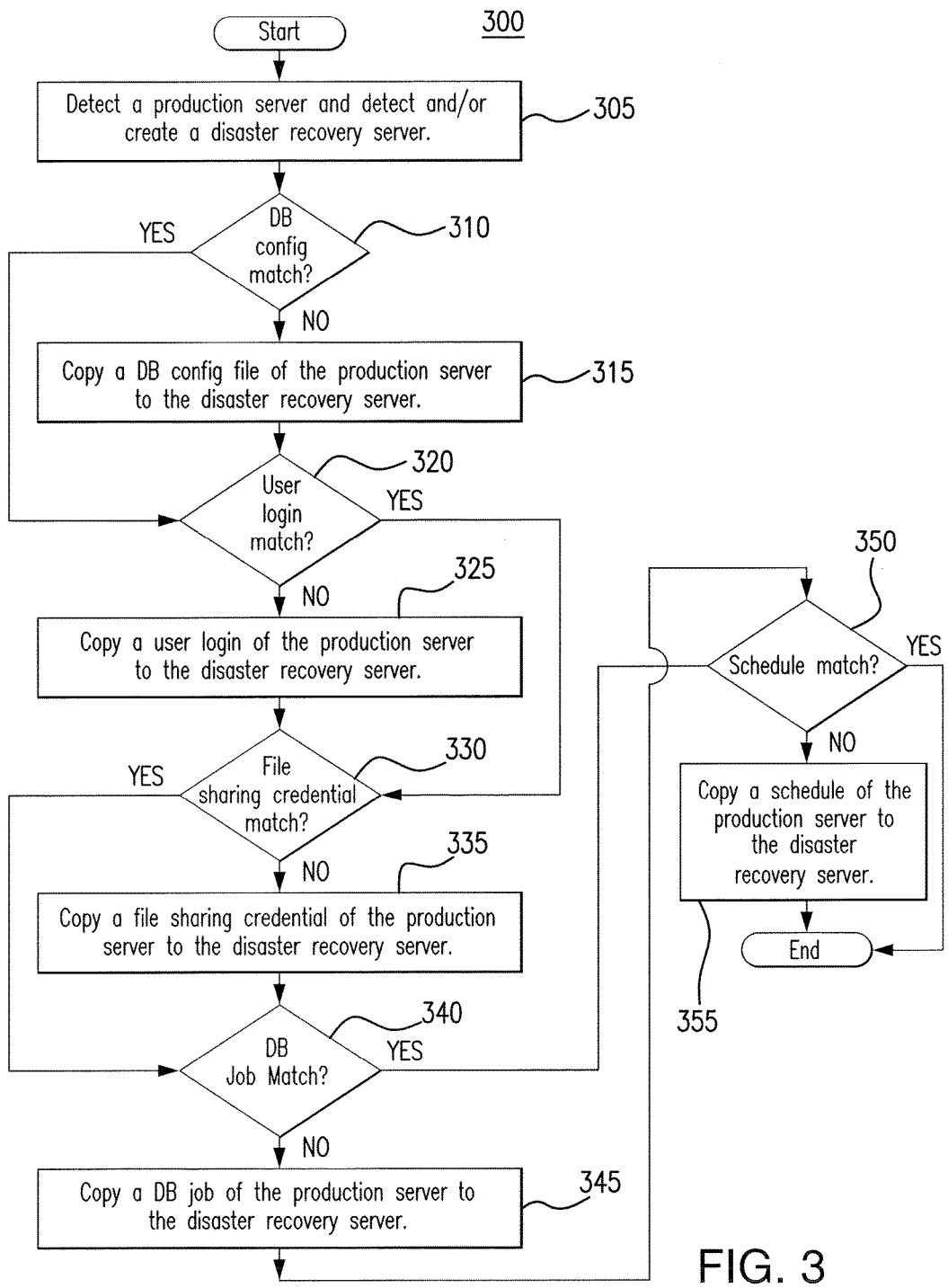
FIG. 3 is a flowchart illustrating a method for disaster recovery using the system of FIG. 1.

Embodiments of the present disclosure and its advantages are best understood by referring to FIGS. 1 through 3 of the drawings, like numerals being used for like and corresponding parts of the various drawings.

Servers and databases store and use information used by applications. In some instances the servers and databases encounter events characterized as disastrous events that result in the information on the servers and databases being destroyed in some manner. For example, the servers and databases may encounter a crash in which the disks or drives that store the information become inoperable. As another example, the servers and databases may encounter an intrusion in which a malicious actor alters and/or deletes information stored on the servers and databases. As yet another example, the servers and databases may encounter an external force such as a natural disaster or a terrorist attack in which the server and/or database is damaged or destroyed. In each of these events, the information on the server and/or database is destroyed and/or becomes inaccessible.

To protect against data loss and/or damage, users may implement a form of data redundancy. For example, users may implement backup servers and backup databases that keep redundant copies of the data and/or information stored in the servers and databases. When the servers and databases are damaged and/or compromised, the users may restore data from the backup servers and databases. However, a disadvantage of existing implementations is that backup servers and databases maintain copies of only application data. As a result, certain types of information such as configuration data, security data and runtime data are not preserved. When it comes time to restore the server and/or database, the restored server and database may not be capable of performing all the functions of the destroyed server or database.

This disclosure contemplates a disaster recovery tool that preserves configuration, security, and runtime information. The disaster recovery tool determines when this information should be copied to disaster recovery servers and then copies that information to disaster recovery servers. By using the disaster recovery tool, disaster recovery servers can maintain information that allows restoration efforts to produce functional servers in particular embodiments. The disaster recovery tool will be described using FIGS. 1 through 3. FIG. 1 will describe the disaster recovery tool generally. FIGS. 2 and 3 will describe the disaster recovery tool in more detail.

FIG. 1 illustrates a system 100 for disaster recovery. As illustrated in FIG. 1, system 100 includes users 105, devices 110, network 115, production servers 120, disaster recovery servers 125, and disaster recovery tool 130. In particular embodiments, system 100 improves the reliability of functions and features of production servers 120 by maintaining copies of configuration security and runtime data in data recovery servers 125.

Devices 110 are any devices capable of communicating with other components of system 100. For example, device 110 may execute applications that use information stored on production server 120. Devices 110 may also write data to production server 120. Additionally, devices 110 may issue commands to disaster recovery tool 130, such as for example, to restore production server 120 using disaster recovery servers 125. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Production servers 120 include any number of servers and/or databases that store and use information used by software applications. For example, production servers 120 may store application data, user logins, jobs, and/or schedules. Furthermore, production servers 120 may store configuration files that indicate the configuration of each production server 120. When an application executes, the application may request and/or send data to production servers 120. Production servers 120 may then process that data and respond to the application. The proper execution of the software application may depend on production servers 120 storing accurate data and/or being functional.

In some instances, production servers 120 may encounter a disastrous event that destroys and/or compromises the data stored in production servers 120. For example, production servers 120 may experience a crash wherein a hardware component of production servers 120 breaks and/or becomes inoperable. As another example, production servers 120 may experience an intrusion in which a malicious actor alters and/or removes data from production servers 120. As yet another example, production servers 120 may encounter an external force such as a natural disaster and/or a terrorist attack that damages and/or destroys production servers 120. In each of these scenarios, data stored on production servers 120 is damaged and/or removed. As a result, the software application may cease to function and/or may cease to function correctly.

One way to mitigate the effects of damaged and/or compromised data is to maintain a redundant copy of that data in another server. Disaster recovery servers 125 store and/or maintain redundant copies of the data and information in production servers 120. In this manner, when data in production servers 120 is damaged and/or removed, that data may be restored using disaster recovery servers 125 or operation may be shifted from production servers 120 to disaster recovery servers 125. Furthermore, when data in production servers 120 is legitimately changed, that data may be written and/or copied to disaster recovery servers 125. In this manner, the effects of disastrous events on production servers 120 is mitigated.

A disadvantage of existing implementations of disaster recovery servers 125 is that only copies of application data are stored and/or maintained in disaster recovery servers 125. As a result, configuration data, security data, and/or runtime data may not be preserved or copied to disaster recovery servers 125 as an exact match of production servers 120. As software applications become more complex, the applications may need configuration data, security data, and runtime data in order to operate appropriately. Furthermore, production servers 120 may function incorrectly if configuration data, security data, and runtime data are not maintained properly. As a result, in the event of a disastrous event, existing implementations of disaster recovery servers 125 may not allow for production servers 120 to become completely restored or disaster recovery servers 125 may not be substituted for production servers 120.

Disaster recovery tool 130 addresses these and other issues by maintaining copies of configuration data, security data, and runtime data in disaster recovery servers 125 along with application data. As illustrated in FIG. 1, disaster recovery tool 130 includes a processor 135 and a memory 140. This disclosure contemplates processor 135 and memory 140 being configured to perform any of the functions of disaster recovery tool 130 described herein.

Processor 135 is any electronic circuitry, including, but not limited to microprocessors, application specific integrated circuits (ASIC), application specific instruction set processor (ASIP), and/or state machines, that communicatively couples to memory 140 and controls the operation of disaster recover tool 130. Processor 135 may be 8-bit, 16-bit, 32-bit, 64-bit or of any other suitable architecture. Processor 135 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 135 may include other hardware and software that operates to control and process information. Processor 135 executes software stored on memory to perform any of the functions described herein. Processor 135 controls the operation and administration of disaster recovery tool 130 by processing information received from network 115, device(s) 110, and memory 140. Processor 135 may be a programmable logic device, a microcontroller, a microprocessor, any suitable processing device, or any suitable combination of the preceding. Processor 135 is not limited to a single processing device and may encompass multiple processing devices.

Memory 140 may store, either permanently or temporarily, data, operational software, or other information for processor 135. Memory 140 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 140, a disk, a CD, or a flash drive. In particular embodiments, the software may include an application executable by processor 135 to perform one or more of the functions described herein.

Disaster recovery tool 130 may detect production servers 120 over network 115. Disaster recovery tool 130 may then determine whether a disaster recovery server 125 should be created for each production server 120. If a disaster recovery server 125 already exists for a production server 120, then disaster recovery tool 130 determines that that production server 120 does not need another disaster recovery server 125 to be created in certain embodiments. In some embodiments, disaster recovery tool 130 may determine that multiple disaster recovery servers 125 should be created for a particular production server 120. In some embodiments, if disaster recovery tool 130 determines that there does not exist a disaster recovery server 125 for a particular production server 120, then disaster recovery tool 130 may determine that a disaster recovery server 125 should be created for production server 120. Disaster recovery tool 130 may include a plug and play feature in which disaster recovery tool 130 automatically detects when a new production server 120 connects to network 115. Disaster recovery tool 130 may then create and/or cause the creation of a disaster recovery server 125 automatically after detecting the new production server 120.

Disaster recovery tool 130 may copy application data from production servers 120 to disaster recovery servers 125. The application data may be used by software applications during execution of the applications. Whenever the application data changes, disaster recovery tool 130 may copy that changed application data from production server 120 to its corresponding disaster recovery server 125. For example, disaster recovery tool 130 may retrieve application data 145 from production servers 120. Disaster recovery tool 130 may also retrieve application data 175 from disaster recovery servers 125. Disaster recovery tool 130 may then compare application data 145 with application data 175 to determine if they are different. If they are different, disaster recovery tool 130 may copy application data 145 to disaster recovery servers 125. If they match, disaster recovery tool 130 may conclude.

Disaster recovery tool 130 may also copy other types of data from production servers 120 to disaster recovery servers 125. For example, disaster recovery tool 130 may copy configuration data, security data, and runtime data from production servers 120 to disaster recovery servers 125.

Disaster recovery tool 130 may preserve configuration data in disaster recovery servers 125. For example, disaster recovery tool 130 may retrieve a database configuration file 155 from production servers 120. Disaster recovery tool 130 may also retrieve a database configuration file 185 from disaster recovery server 125. Disaster recovery tool 130 may compare database configuration file 155 with database configuration file 185. If they match, disaster recover tool 130 may do nothing. If they do not match, disaster recovery tool 130 may copy database configuration file 155 to disaster recovery servers 125. In this manner, disaster recovery tool 130 preserves configuration information in disaster recovery servers 125. This disclosure contemplates disaster recovery tool 130 preserving any appropriate type of configuration data for production servers 120. Disaster recovery tool 130 may also detect when database configuration file 155 changes and automatically copy the changed database configuration file 155 to disaster recovery server 125.

Disaster recovery tool 130 may preserve security information in disaster recovery servers 125. For example, disaster recovery tool 130 may retrieve user login 150 and file sharing credential 160 from production servers 120. User login 150 may include authentication information for a user 105. File sharing credential 160 may identify users 105 who should be allowed access to information stored on production servers 120. Disaster recovery tool 130 may also retrieve user login 180 and file sharing credential 190 from disaster recovery servers 125. Disaster recovery tool 130 may then compare user login 150 with user login 180 and file sharing credential 160 with file sharing credential 160 with file sharing credential 190. If either of the user logins and/or file sharing credentials do not match, then disaster recovery tool 130 may copy user login 150 and/or file sharing credential 160 to disaster recovery servers 125. In this manner, disaster recovery tool 130 may preserve security information and disaster recovery servers 125. Disaster recovery tool 130 may also detect when user login 150 and/or file sharing credential 160 change and automatically copy the changed user login 150 and/or file sharing credential 160 to disaster recovery server 125. This disclosure contemplates disaster recovery tool 130 preserving any appropriate type of security information in disaster recovery servers 125.

Disaster recovery tool 130 may preserve runtime information in disaster recovery servers 125. For example, disaster recovery tool 130 may preserve jobs and schedules in disaster recovery servers 125. Disaster recovery tool 130 may retrieve database job 165 and schedule 170 from production servers 120. Disaster recovery tool 130 may also retrieve database job 195 and schedule 198 from disaster recovery servers 125. Disaster recovery tool 130 then compares database job 165 with database job 195 and schedule 170 with schedule 198. If either the database jobs or the schedules do not match, then disaster recovery tool 130 may copy database job 165 and/or schedule 170 to disaster recovery servers 125. In this manner, disaster recovery tool 130 preserves runtime information in disaster recovery servers 125. Disaster recovery tool 130 may also detect when database job 165 and/or schedule 170 change and automatically copy the changed database job 165 and/or schedule 170 to disaster recovery server 125. This disclosure contemplates disaster recovery tool 130 preserving any appropriate runtime information in disaster recovery servers 125.

In particular embodiments, disaster recovery tool 130 may compare and/or copy database layouts or schemas from production servers 120 to disaster recovery servers 125. For example, disaster recovery tool 130 may compare column names and table references between production servers 120 and disaster recovery servers 125 and make appropriate copies and/or corrections in disaster recovery servers 125.

In some embodiments, disaster recovery tool 130 may allow customization of what types of information is compared and copied. For example, disaster recovery tool 130 may allow a user 105 to designate what types of information should be compared and/or copied. User 105 may designate that only security information should be compared and copied and, as a result, disaster recovery tool 130 may not compare and/or copy configuration and runtime information. This disclosure contemplates disaster recovery tool 130 comparing and/or copying any type of information or any combination of types of information.

In particular embodiments, by preserving such information in disaster recovery servers 125, disaster recovery tool 130 improves the reliability of functions and features of production servers 120 because information that may be needed to restore production servers 120 to full functionality is preserved in disaster recovery servers 125. In this manner, production servers 120 may be restored and software applications may function appropriately despite a disastrous event occurring to production servers 120.

In particular embodiments, disaster recovery tool 130 may dynamically adjust a size of a production server 120. For example, production server 120 may store a database file and/or a database configuration file 155. The database file may indicate a maximum storage size of the production server 120. Disaster recovery tool 130 may analyze the size of production server 120 and the maximum storage size indicated by the database file. Disaster recovery tool 130 may determine a difference between the size of production server 120 and the size limit or maximum size indicated by the database file. If the difference is less than a threshold, then disaster recovery tool 130 may determine that the production server 120 is about to reach max capacity. In response to that determination, disaster recovery tool 130 may increase the size limit indicated by the database file. As a result, the size of production server 120 may grow without hitting the max size limit. In this manner, data may be written to production server 120 without concern for overflowing the storage capacity of production server 120.

FIG. 2 illustrates the disaster recovery tool 130 of the system 100 of FIG. 1. As illustrated in FIG. 2, disaster recovery tool 130 includes a server monitoring engine 200, a configuration engine 205, a security engine 210, a runtime engine 215, an expansion engine 220, and a logging engine 225. In particular embodiments, disaster recovery tool 130 improves the operation of a production server by preserving application data, configuration data, security data and runtime data in a disaster recovery server.

Server monitoring engine 200 detects production servers 120 and disaster recovery servers 125. When server monitoring engine 200 detects a production server 120, server monitoring engine 200 then determines whether that production server 120 has a corresponding disaster recovery server 125. If a corresponding disaster recovery server 125 exists, sever monitoring engine 200 may do nothing more. If a corresponding disaster recovery server 125 does not exist for a production server 120, then server monitoring engine 200 may cause the creation of disaster recovery server 125. In some embodiments, server monitoring engine 200 may cause the creation of a second disaster recovery server 125 for production server 120. In this manner, even if production server 120 had a corresponding disaster recovery server 125, server monitoring engine 200 may still create another disaster recovery server 125 for production server 120. In some embodiments, server monitoring engine 200 allows for a plug and play feature in which server monitoring engine 200 detects that a new production server 120 has been added to system 100. In response to detecting the new production server 120, server monitoring engine 200 creates and/or causes the creation of a new disaster recovery server 125. Server monitoring engine 200 may detect production server 120 by receiving a notification that production server 120 has been added to system 100. An example algorithm for server monitoring engine 200 is as follows: wait for notification of production server 120; receive notification about production server 120; determine whether production server 120 has a corresponding disaster recovery server 125; create and/or cause the creation of disaster recovery server 125 if production server 120 does not have a corresponding disaster recovery server 125.

Configuration engine 205 preserves configuration data of production server 120. For example, configuration engine 205 may preserve database configuration files of production server 120. Configuration engine 205 may receive database configuration file 155 from production server 120 and database configuration file 185 from disaster recovery server 125. Configuration engine 205 may then compare database configuration file 155 and database configuration file 185. If they match, configuration engine 205 may determine that the configuration data in disaster recovery server 125 is up to date. If they do not match, configuration engine 205 may determine that the configuration information in disaster recovery server 125 is not up to date and copy database configuration file 155 from production server 120 to disaster recovery server 125. In this manner, configuration engine 205 may preserve the configuration information of production server 120 in disaster recovery server 125. An example algorithm followed by configuration engine 205 is as follows: retrieve database configuration file 155 from production server 120; retrieve database configuration file 185 from disaster recovery server 125; compare database configuration file 155 and database configuration file 185; if database configuration file 155 does not match database configuration file 185, then copy database configuration file 155 to disaster recovery server 125.

This disclosure contemplates configuration engine 205 comparing and copying any type of configuration information. For example, configuration engine 205 may compare a Structured Query Language Server Integration Services package version of production server 120 with a Structured Query Language Server Integration Services package version of the disaster recovery server 125. If the versions do not match, configuration engine 205 may copy and/or install the Structured Query Language Server Integration Services package of production server 120 to disaster recovery server 125. As another example, configuration engine 205 may compare a database instance configuration of production server 120 with a database instance configuration of disaster recovery server 125. If the instances do not match, configuration engine 205 may copy and/or re-instantiate the database instance configuration of production server 120 on disaster recovery server 125.

Security engine 210 may preserve the security data of production server 120. For example, security engine 210 may preserve user logins and file sharing credentials. Security engine 210 may retrieve user login 150 and file sharing credential 160 from production server 120. Security engine 210 may also retrieve user login 180 and file sharing credential 190 from disaster recovery server 125. Security engine 210 may then compare user login 150 with user login 180 and file sharing credential 160 with file sharing credential 190. If user login 150 does not match user login 180, security engine 210 may determine that user login 180 is not up to date and copy user login 150 from production server 120 to disaster recovery server 125. If file sharing credential 160 does not match file sharing credential 190, then security engine 210 may determine that file sharing credential 190 is not up to date and copy file sharing credential 160 from production server 120 to disaster recovery server 125. User login 150 and user login 180 may include user authentication information. File sharing credential 160 and file sharing credential 190 may identify users who have access to information stored on production server 120. An example algorithm for a security engine 210 is as follows: retrieve user login 150 and file sharing credential 160 from production server 120; retrieve user login 180 and file sharing credential 190 from disaster recovery server 125; compare user login 150 with user login 180; compare file sharing credential 160 with file sharing credential 190; if user login 150 does not match user login 180, copy user login 150 to disaster recovery server 125; if file sharing credential 160 does not match file sharing credential 190, copy file sharing credential 160 to disaster recovery server 125.

Runtime engine 215 preserves runtime data in disaster recovery server 125. For example, runtime engine 215 may preserve database jobs and schedules. Runtime engine 215 may retrieve database job 165 and schedule 170 from production server 120. Runtime engine 215 may also retrieve database job 195 and schedule 198 from disaster recovery server 125. Runtime engine 215 may then compare database job 165 with database job 195 and schedule 170 with schedule 198. If database job 165 does not match database job 195, runtime engine 215 may copy database job 165 from production server 120 to disaster recovery server 125. If schedule 170 does not match schedule 198, runtime engine 215 may copy schedule 170 from production server 120 to disaster recovery server 125. An example algorithm for runtime engine 215 is as follows: retrieve database job 165 and schedule 170 from production server 120; retrieve database job 195 and schedule 198 from disaster recovery server 125; compare database job 165 with database job 195 and schedule 170 with schedule 198; if database job 165 does not match database job 195, copy database job 165 from production server 120 to disaster recovery server 125; if schedule 170 does not match schedule 198, copy schedule 170 from production server 120 to disaster recovery server 125.

Expansion engine 220 may dynamically adjust the size limit of production server 120. Expansion engine 220 may retrieve a database file 230 from production server 120. Database file 230 may indicate a size limit 240 of production server 120. Expansion engine 220 may also determine a database size 235 of production server 120. Database size 235 may indicate the amount of information stored on production server 120. Expansion engine 220 may then determine whether database size 235 is approaching the size limit 240 (e.g., by comparing a difference between database size 235 and size limit 240 to a threshold). If so, expansion engine 220 may adjust size limit 240 in database file 230. Expansion engine 220 may then send size limit 240 back to production server 120. In this manner, the size limit of production server 120 may be dynamically adjusted based on database size 235. An example algorithm for expansion engine 220 is as follows: retrieve database file 230 from production server 120; determine the database size 235 of production server 120; determine a difference between size limit 240 and database size 235; determine whether that difference is below a threshold; if the difference is below a threshold, dynamically increase size limit 240; communicate size limit 240 to production server 120. In particular embodiments, expansion engine 220 generates and communicates an alert if the difference between database size 235 and size limit 240 is below the threshold. In this manner, users may be notified of the production server size needing to be increased.

Logging engine 225 may maintain a log 245 that indicates the information that has been copied from production server 120 to disaster recovery server 125. Log 245 may indicate a plurality of files that have been copied from production server 120 to disaster recovery server 125. For example, log 245 may indicate that database configuration file 155 has been copied from production server 120 to disaster recovery server 125. As another example, log 245 may indicate that user login 150 and/or file sharing credential 160 have been copied from production server 120 to disaster recovery server 125. As yet another example, log 245 may indicate database job 165 and schedule 170 have been copied from production server 120 to disaster recovery server 125. An example algorithm for login engine 225 is as follows: wait for action performed by disaster recovery tool 130; receive a notification of a file copied from production server 120 to disaster recovery server 125; indicate in log 245 the file that has been copied from production server 120 to disaster recovery server 125.

FIG. 3 is a flowchart illustrating a method 300 for disaster recovery using the system 100 of FIG. 1. In particular embodiments, disaster recovery tool 130 performs method 300. By performing method 300, disaster recovery tool 130 improves the operation of a production server by preserving configuration data, runtime data, and security data in a disaster recovery server.

Disaster recovery tool 130 begins by detecting a production server and detecting and/or creating a disaster recovery server in step 305. In step 310, disaster recovery tool 130 determines whether database configuration files of the production server and the disaster recovery server match. If they do match, disaster recovery tool 130 proceeds to step 320. If they do not match, disaster recovery tool 130 copies the database configuration file of the production server to the disaster recovery server in step 315.

In step 320, disaster recovery tool 130 determines whether user logins of the production server and the disaster recovery server match. If they do match, disaster recovery tool 130 proceeds to step 330. If they do not match, disaster recovery tool 130 copies a user login of the production server to the disaster recovery server in step 325.

In step 330, disaster recovery tool 130 determines whether a file sharing credential of the production server matches a file sharing credential of the disaster recovery server. If they do match, disaster recovery tool 130 proceeds to step 340. If they do not match, disaster recovery tool 130 copies a file sharing credential of the production server to the disaster recovery server in step 335.

In step 340, disaster recovery tool 130 determines whether a database job of the production server matches a database job of the disaster recovery server. If they do match, disaster recovery tool 130 proceeds to step 350. If they do not match, disaster recovery tool 130 copies a database job of the production server to the disaster recovery server in step 345.

In step 350, disaster recovery tool 130 determines whether a schedule of the production server matches a schedule of the disaster recovery server. If they match, disaster recovery tool 130 concludes method 300. If they do not match, disaster recovery tool 130 copies the schedule of the production server to the disaster recovery server in step 355.

Modifications, additions, or omissions may be made to method 300 depicted in FIG. 3. Method 300 may include more, fewer, or other steps. For example, steps may be performed in parallel or in any suitable order. While discussed as disaster recovery tool 130 performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A disaster recovery tool comprising:
a server monitoring engine configured to:
   detect a production server; and
   determine that a disaster recovery server should be created for the production server;
a configuration engine configured to:
   compare a database configuration file for the production server with a database configuration file for the disaster recovery server;
   determine, based on comparing the database configuration file for the production server with the database configuration file for the disaster recovery server, that the database configuration file for the production server does not match the database configuration file for the disaster recovery server; and
   in response to determining that the database configuration file for the production server does not match the database configuration file for the disaster recovery server, copy the database configuration file for the production server to the disaster recovery server;
a security engine configured to:
   compare a user login of the production server with a user login of the disaster recovery server;
   determine, based on comparing the user login of the production server with the user login of the disaster recovery server, that the user login of the production server does not match the user login of the disaster recovery server;
   in response to determining that the user login of the production server does not match the user login of the disaster recovery server, copy the user login of the production server to the disaster recovery server;
   compare a file sharing credential of the production server with a file sharing credential of the disaster recovery server;
   determine, based on comparing the file sharing credential of the production server with the file sharing credential of the disaster recovery server, that the file sharing credential of the production server does not match the file sharing credential of the disaster recovery server; and
   in response to determining that the file sharing credential of the production server does not match the file sharing credential of the disaster recovery server, copy the file sharing credential of the production database to the disaster recovery server; and
a runtime engine configured to:
   compare a database job of the production server with a database job of the disaster recovery server;
   determine, based on comparing the database job of the production server with the database job of the disaster recovery server, that the database job of the production server does not match the database job of the disaster recovery server;
   in response to determining that the database job of the production server does not match the database job of the disaster recovery server, copy the database job of the production server to the disaster recovery server;
   compare a schedule of the production server with a schedule of the disaster recovery server;
   determine, based on comparing the schedule of the production server with the schedule of the disaster recovery server, that the database job of the production server does not match the database job of the disaster recovery server; and in response to determining that the database job of the production server does not match the database job of the disaster recovery server, copy the schedule of the production server to the disaster recovery server.

2. The disaster recovery tool of claim 1, further comprising an expansion engine configured to:
compare a storage size of the disaster recovery server with a size limit indicated by a database file stored in the disaster recovery server;
determine that a difference between the size limit and the storage size is less than a threshold; and
in response to the determination that the difference is less than the threshold, increase the size limit indicated by the database file.

3. The disaster recovery tool of claim 2, wherein the expansion engine is further configured to communicate an alert in response to the determination that the difference is less than the threshold.

4. The disaster recovery tool of claim 1, further comprising a logging engine configured to maintain a log indicating a plurality of files that have been copied from the production server to the disaster recovery server.

5. The disaster recovery tool of claim 1, wherein the configuration engine is further configured to compare a Structured Query Language Server Integration Services package version of the production server with a Structured Query Language Server Integration Services package version of the disaster recovery server.

6. The disaster recovery tool of claim 1, wherein the configuration engine is further configured to compare a database instance configuration of the production server with a database instance configuration of the disaster recovery server.

7. The disaster recovery tool of claim 1, wherein the server monitoring engine is further configured to create a second disaster recovery server in response to a notification that a second production server has been added.

8. A method comprising:
detecting a production server;
determining that a disaster recovery server should be created for the production server;
comparing a database configuration file for the production server with a database configuration file for the disaster recovery server;
determining, based on comparing the database configuration file for the production server with the database configuration file for the disaster recovery server, that the database configuration file for the production server does not match the database configuration file for the disaster recovery server;
in response to determining that the database configuration file for the production server does not match the database configuration file for the disaster recovery server, copying the database configuration file for the production server to the disaster recovery server;
comparing a user login of the production server with a user login of the disaster recovery server;
determining, based on comparing the user login of the production server with the user login of the disaster recovery server, that the user login of the production server does not match the user login of the disaster recovery server;
in response to determining that the user login of the production server does not match the user login of the disaster recovery server, copying the user login of the production server to the disaster recovery server;
comparing a file sharing credential of the production server with a file sharing credential of the disaster recovery server;
determining, based on comparing the file sharing credential of the production server with the file sharing credential of the disaster recovery server, that the file sharing credential of the production server does not match the file sharing credential of the disaster recovery server;
in response to determining that the file sharing credential of the production server does not match the file sharing credential of the disaster recovery server, copying the file sharing credential of the production database to the disaster recovery server;
comparing a database job of the production server with a database job of the disaster recovery server;
determining, based on comparing the database job of the production server with the database job of the disaster recovery server, that the database job of the production server does not match the database job of the disaster recovery server;
in response to determining that the database job of the production server does not match the database job of the disaster recovery server, copying the database job of the production server to the disaster recovery server;
comparing a schedule of the production server with a schedule of the disaster recovery server;
determining, based on comparing the schedule of the production server with the schedule of the disaster recovery server, that the database job of the production server does not match the database job of the disaster recovery server; and
in response to determining that the database job of the production server does not match the database job of the disaster recovery server, copying the schedule of the production server to the disaster recovery server.

9. The method of claim 8, further comprising:
comparing a storage size of the disaster recovery server with a size limit indicated by a database file stored in the disaster recovery server;
determining that a difference between the size limit and the storage size is less than a threshold; and
in response to the determination that the difference is less than the threshold, increasing the size limit indicated by the database file.

10. The method of claim 9, further comprising communicating an alert in response to the determination that the difference is less than the threshold.

11. The method of claim 8, further comprising maintaining a log indicating a plurality of files that have been copied from the production server to the disaster recovery server.

12. The method of claim 8, further comprising comparing a Structured Query Language Server Integration Services package version of the production server with a Structured Query Language Server Integration Services package version of the disaster recovery server.

13. The method of claim 8, further comprising comparing a database instance configuration of the production server with a database instance configuration of the disaster recovery server.

14. The method of claim 8, further comprising creating a second disaster recovery server in response to a notification that a second production server has been added.

15. A system comprising:
a production server; and
a disaster recovery tool configured to:
- determine that a disaster recovery server should be created for the production server;
- compare a database configuration file for the production server with a database configuration file for the disaster recovery server;
- determine, based on comparing the database configuration file for the production server with the database configuration file for the disaster recovery server, that the database configuration file for the production server does not match the database configuration file for the disaster recovery server;
- in response to determining that the database configuration file for the production server does not match the database configuration file for the disaster recovery server, copy the database configuration file for the production server to the disaster recovery server;
- compare a user login of the production server with a user login of the disaster recovery server;
- determine, based on comparing the user login of the production server with the user login of the disaster recovery server, that the user login of the production server does not match the user login of the disaster recovery server;
- in response to determining that the user login of the production server does not match the user login of the disaster recovery server, copy the user login of the production server to the disaster recovery server;
- compare a file sharing credential of the production server with a file sharing credential of the disaster recovery server;
- determine, based on comparing the file sharing credential of the production server with the file sharing credential of the disaster recovery server, that the file sharing credential of the production server does not match the file sharing credential of the disaster recovery server;
- in response to determining that the file sharing credential of the production server does not match the file sharing credential of the disaster recovery server, copy the file sharing credential of the production database to the disaster recovery server;
- compare a database job of the production server with a database job of the disaster recovery server;
- determine, based on comparing the database job of the production server with the database job of the disaster recovery server, that the database job of the production server does not match the database job of the disaster recovery server;
- in response to determining that the database job of the production server does not match the database job of the disaster recovery server, copy the database job of the production server to the disaster recovery server;
- compare a schedule of the production server with a schedule of the disaster recovery server;
- determine, based on comparing the schedule of the production server with the schedule of the disaster recovery server, that the database job of the production server does not match the database job of the disaster recovery server; and
- in response to determining that the database job of the production server does not match the database job of the disaster recovery server, copy the schedule of the production server to the disaster recovery server.

16. The system of claim 15, wherein the disaster recovery tool is further configured to:
- compare a storage size of the disaster recovery server with a size limit indicated by a database file stored in the disaster recovery server;
- determine that a difference between the size limit and the storage size is less than a threshold; and
- in response to the determination that the difference is less than the threshold, increase the size limit indicated by the database file.

17. The system of claim 16, wherein the disaster recovery tool is further configured to communicate an alert in response to the determination that the difference is less than the threshold.

18. The system of claim 15, wherein the disaster recovery tool is further configured to maintain a log indicating a plurality of files that have been copied from the production server to the disaster recovery server.

19. The system of claim 15, wherein the disaster recovery tool is further configured to compare a Structured Query Language Server Integration Services package version of the production server with a Structured Query Language Server Integration Services package version of the disaster recovery server.

20. The system of claim 15, wherein the disaster recovery tool is further configured to compare a database instance configuration of the production server with a database instance configuration of the disaster recovery server.

21. The system of claim 15, wherein the disaster recovery tool is further configured to create a second disaster recovery server in response to a notification that a second production server has been added.

* * * * *